(12) United States Patent
Ramaswamy et al.

(10) Patent No.: US 7,906,012 B2
(45) Date of Patent: Mar. 15, 2011

(54) METHOD FOR REDUCING FOAM IN A PRIMARY FRACTIONATOR

(75) Inventors: Perumangode Neelakantan Ramaswamy, Mumbai (IN); Mahesh Subramaniyam, Maharashtra (IN)

(73) Assignee: Dorf Ketal Chemicals India Pvt. Ltd., Mumbai (IN)

( * ) Notice: Subject to any disclaimer, the term of this patent is extended or adjusted under 35 U.S.C. 154(b) by 1009 days.

(21) Appl. No.: 10/196,725

(22) Filed: Jul. 16, 2002

(65) Prior Publication Data

US 2004/0015032 A1 Jan. 22, 2004

(51) Int. Cl.
C10G 9/12 (2006.01)
C10G 9/16 (2006.01)

(52) U.S. Cl. ............... 208/48 AA; 208/48 R; 208/48 Q; 208/348; 208/349; 208/365; 585/866; 585/952

(58) Field of Classification Search ............... 208/48 R, 208/48 AA, 48 Q, 348, 349, 365; 585/565, 585/866, 952

See application file for complete search history.

(56) References Cited

U.S. PATENT DOCUMENTS

| | | | |
|---|---|---|---|
| 2,702,793 A | 2/1955 | Smith | |
| 2,862,885 A | 12/1958 | Nelson et al. | |
| 2,884,474 A * | 4/1959 | Finigan et al. | 585/866 |
| 3,535,399 A | 10/1970 | Tabler | |
| 3,645,886 A * | 2/1972 | Gillespie et al. | 208/48 AA |
| 3,668,111 A * | 6/1972 | Dvoracek et al. | 208/48 AA |
| 3,793,187 A | 2/1974 | Marx et al. | |
| 4,005,044 A | 1/1977 | Raleigh | |
| 4,329,528 A | 5/1982 | Evans | |
| 4,473,465 A | 9/1984 | Veatch et al. | |
| 4,578,178 A * | 3/1986 | Forester | 208/48 AA |
| 4,673,489 A | 6/1987 | Roling | |
| 4,952,301 A | 8/1990 | Awbrey | |
| 4,961,840 A * | 10/1990 | Goyal | 208/131 |
| 5,160,425 A | 11/1992 | Lewis | |
| 5,194,143 A | 3/1993 | Roling | |
| 5,220,104 A | 6/1993 | McDaniel et al. | |
| 5,221,461 A | 6/1993 | Henrici et al. | |
| 5,264,114 A | 11/1993 | Dunbar | |
| 5,288,394 A | 2/1994 | Lewis et al. | |
| 5,354,450 A | 10/1994 | Tong et al. | |
| 5,389,299 A | 2/1995 | Hart | |
| 5,445,743 A | 8/1995 | Rowe et al. | |
| 5,454,979 A | 10/1995 | Kobayashi et al. | |
| 5,472,637 A * | 12/1995 | Hart | 516/116 |
| 5,488,141 A | 1/1996 | Bauer, Jr. et al. | |
| 5,582,808 A | 12/1996 | Patek | |
| 5,656,150 A | 8/1997 | Reed et al. | |
| 5,667,669 A | 9/1997 | Hart | |
| 5,714,055 A | 2/1998 | Lewis et al. | |
| 5,750,052 A | 5/1998 | Hart et al. | |
| 5,770,041 A | 6/1998 | Lewis et al. | |
| 5,789,613 A | 8/1998 | Bauer, Jr. et al. | |
| 5,800,738 A | 9/1998 | Hart | |
| 5,985,940 A | 11/1999 | Manek et al. | |
| 6,063,725 A | 5/2000 | Sunaga et al. | |
| 6,372,121 B1 | 4/2002 | McClain et al. | |
| 6,596,862 B2 | 7/2003 | Böttcher et al. | |
| 6,986,839 B2 | 1/2006 | Subramaniyam et al. | |
| 2003/0009057 A1 | 1/2003 | Vicari et al. | |
| 2005/0224394 A1 | 10/2005 | Subramaniyam | |

FOREIGN PATENT DOCUMENTS

| | | |
|---|---|---|
| CA | 1107672 | 8/1981 |
| CN | 1649982 A | 8/2005 |
| DE | 2333588 A1 | 2/1975 |
| EP | 0264280 A2 | 4/1988 |
| EP | 0619361 | 10/1994 |
| EP | 0686622 A1 | 12/1995 |
| EP | 0698652 | 2/1996 |
| EP | 0824142 A2 | 2/1998 |
| EP | 1116778 A1 | 7/2001 |
| FR | 2397450 | 2/1979 |
| JP | 03-043494 | 2/1991 |
| JP | 05156233 | 6/1993 |
| JP | 2002503749 T | 2/2002 |
| WO | 9941328 A1 | 8/1999 |
| WO | WO-0155071 A | 8/2001 |
| WO | 0236715 A1 | 5/2002 |
| WO | 2004003110 A1 | 1/2004 |
| WO | 2004007642 A1 | 1/2004 |

OTHER PUBLICATIONS

Foreign communication from a related counterpart application—European Patent Office Examination of Application No. 02 781 738 6, Aug. 16, 2005, 6 pages.

Foreign communication from a related counterpart application—International Preliminary Examination Report, PCT/IN02/00195, Sep. 10, 2004, 12 pages.

Foreign communication from a related counterpart application—International Search Report, PCT/IN02/00195, Jun. 6, 2003, 5 pages.

Foreign communication from a related counterpart application—Invitation to Pay Additional Fees, PCT/IN02/00195, Mar. 10, 2003, 4 pages.

Foreign communication from a related counterpart application—Written Opinion, PCT/IN02/00195, Mar. 10, 2004, 8 pages.

Foreign communication from a related counterpart application—Written Opinion, PCT/IN02/00196, Apr. 5, 2004, 6 pages.

(Continued)

*Primary Examiner* — Tam M Nguyen
(74) *Attorney, Agent, or Firm* — Conley Rose, P.C.; Rodney B. Carroll

(57) ABSTRACT

The present invention includes methods for improving the operational parameters in primary fractionators which are experiencing diminished operation efficiencies due to deposits of polymerized hydrocarbon species. The invention comprises the step of adding a foam reducing amount of a foam reducing composition at the primary fractionator. A reduction in foaming is achieved whereby the operational efficiency of the process is improved based upon operation parameters including, but not limited to, liquid-gas contact ratio, product top temperature, pressure differentials, gasoline end point or combinations thereof.

24 Claims, 2 Drawing Sheets

OTHER PUBLICATIONS

Marvel, C. S., et al., "Some derivatives of ϵ-Caprolactam1,2," Contribution from the Noyes Chemical Laboratory, University of Illinois, Sep. 1957, pp. 1065-1067, vol. 22.

Office Action dated Sep. 24, 2007 (22 pages), U.S. Appl. No. 11/021,389, filed Dec. 23, 2004.

Office Action dated Feb. 13, 2008 (31 pages), U.S. Appl. No. 11/021,389, filed Dec. 23, 2004.

Office Action (Final) dated Aug. 28, 2008 (30 pages), U.S. Appl. No. 11/021,389, filed Dec. 23, 2004.

Japanese Office Action dated Mar. 11, 2008 (8 pages), Japanese Patent Application No. 2004-521071 corresponding to U.S. Appl. No. 10/196,725 and International Application No. PCT/IN02/000196.

* cited by examiner

METHOD FOR REDUCING FOAM IN A PRIMARY FRACTIONATOR

BACKGROUND AND SUMMARY OF THE INVENTION

This invention relates to a method of operating a primary fractionator, also termed a quench tower, in an ethylene plant with anti-foulants, particularly defoamers.

In the manufacture of lighter hydrocarbon products such as ethylene, heavier hydrocarbons such as naphtha or diesel oil are cracked in pyrolysis heaters at temperatures of approximately 850° C. to form mixtures of smaller molecules including, but not limited to, ethylene, propylene, and butadiene. Such mixtures, commonly termed cracked gases, are cooled in various stages of an ethylene plant until they are separated in the fractionation section of the ethylene plant During primary heat recovery, the cracked gases pass through and are cooled by a series of heat exchangers, also termed transfer line exchangers, before being quenched with a heavy oil. This heavy oil, which is known as quench oil or bottoms quench oil, accumulates in the bottom of the primary fractionator. The primary fractionator contains varying components of fuel oil species ranging from the bottoms of the column to the beginning of what is called the rectification section of the column. The rectification section of the column is prone to severe fouling problems related to species such as styrene, indene, di-vinyl benzene, alpha-methyl styrene, indene derivatives, naphthalene and other higher ring compound derivatives.

The polymerization products of these species deposit at a very rapid rate not only on upper tray surfaces, but also beneath tray surfaces. Due to this fouling problem, an increase in column pressure drop along with reduction in fractionation efficiencies are experienced. Consequently, the quality of gasoline condensing in the quench water tower and also the quality of fuel oil made from the system are negatively effected. Typically, the problem of fouling in the rectification section is also accompanied by poor viscosity control in the bottom of the quench oil tower due to improper operations of the primary fractionator. The deposition of the fouling species, commonly as polymers, obstructs the vapor and liquid flow inside the fractionator and due to the reduced surface area available, the environment is conducive to increased froth/foam generation in the column. The presence of foam further increases the pressure drop and results in entrainment of higher boiling point products into the lighter products and vice versa. Due to excessive foaming, the column pressure drop increases very rapidly and is a major reason for reduced unit efficiencies.

As fouling continues to occur, the rate of foaming also increases in the column resulting in plant operators having to reduce unit feed rates significantly and, ultimately, shut down the plant for cleaning the primary fractionator.

The present invention provides a method to operate primary fractionators which are fouled due to polymer deposition by providing an appropriate chemical agent to extend run-length of the primary fractionator.

DETAILED DESCRIPTION OF THE INVENTION

Figure 1:
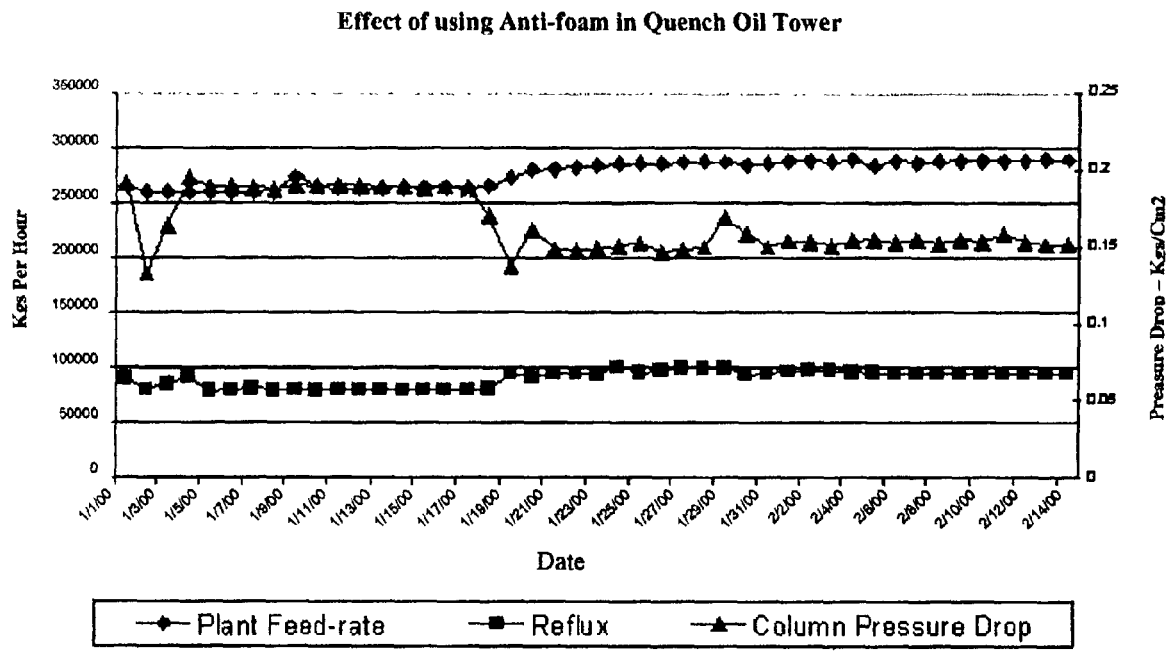
FIG. 1 illustrates data for Example 1 in which the feed rate, reflux rate, and column pressure of a primary fractionation column are plotted against time.

The present invention includes methods for reducing foam in primary fractionators which are experiencing diminished operation efficiencies due to deposits of polymerized hydrocarbon species. The invention comprises the step of adding a foam reducing amount of a foam reducing composition at the primary fractionator. A reduction in foaming is achieved whereby the operational efficiency of the process is improved based upon operation parameters including, but not limited to, liquid-gas contact ratio, product top temperature, pressure differentials, gasoline end point or combinations thereof.

The preferred foam reducing composition is a polysiloxane. A representative polysiloxane useful in the present invention is dimethyl polysiloxane. This is a commercially available chemical which can be purchased, for example, from Dorf Ketal Chemicals India Pvt. Ltd. Other suitable foam reducing compositions include, but are not limited to, ethylene oxide-propylene oxide copolymers, fatty acid ethoxylates, poly-iso-butylenes and fatty acid esters. Suitable examples of these compounds are also available from Dorf Ketal Chemicals India Pvt. Ltd.

The foam reducing composition may be added to the process in neat form, or in any suitable solvent. Representative solvents may be aromatic in character and include, but are not limited to, toluene, xylene, naphtha. It is preferred that the foam reducing composition be applied either upstream of the particular site experiencing foaming problems or directly to the site of the foaming problem. Specifically, the deposit reducing composition may be added continuously or periodically to the primary fractionator reflux. Primary fractionators may themselves include internal components including ripple trays, sieve trays, bubble cap trays, valve trays The preferred polysiloxane described above may be applied to the process at end use concentrations ranging from 0.0001% to 0.1% with 0.0005% to 0.0025% being the preferred range (all percentages herein are expressed on a weight/weight basis). These percentages convert into working dosage rates of 1 part per million to about 1000 parts per million hydrocarbon. Specific dosages may be determined by the conditions existing in the particular process. Although the most preferred range for a polysiloxane is provided, it is understood that the present invention is not to be limited by the specific compound or concentration set forth herein. It is further envisioned that the present invention may be applied to the process along with other hydrocarbon treatment agents such as corrosion inhibiting compositions.

The following examples are provided in order to more clearly illustrate the present invention, and while being illustrative, are in no way meant to be construed as limiting the scope of the present invention.

EXAMPLE 1

An ethylene production plant utilizing naphtha in the production of light hydrocarbons including ethylene, propylene, and butadiene experienced fouling of the primary fractionator resulting in reduction of column efficiencies even when operated at lower than normal feed rates. Considering the loss of column efficiencies indicated by higher column pressure drop and increased gasoline end point even at 20% reduced plant feed rates, the plant operators contemplated shutting the unit down to clean the column.

However, the present invention was practiced on the respective process in order to achieve acceptable operational parameters and the utility of the present invention was thusly demonstrated. An anti-foaming agent comprising a polysiloxane was injected along with the reflux to the column. The particular agent was dimethyl polysiloxane available from Dorf Ketal Chemicals India Pvt. Ltd. and was fed into the column so as to achieve a working concentration of approximately 100 parts per million.

Within a few hours of using the anti-foaming agent, column pressure drop was reduced as shown in FIG. 1. It was observed that during the fouled condition, the gasoline end point had increased by 20° C., which was also reflected in the color of the respective gasoline. The fouled condition resulted in a brownish colored gasoline in contrast to gasoline normally having a yellowish green coloration. After the polysiloxane compound was injected into the reflux, the plant operators subsequently observed that the color of the gasoline was restored to its normal yellowish green color, along with reduction in gasoline end point indicating improvement of the column operations.

FIG. 1 illustrates the data associated with this experiment wherein time is provided on the X axis and the kilograms per hour of feed rate and reflux mass are provided on the left hand Y axis. In addition, pressure drop in kilograms per centimeter$^2$ is provided on the right hand Y axis. Arrow A indicates the initial injection of the polysiloxane compound into the reflux. Column pressure was measured, as indicated on the X axis. A dramatic reduction in column pressure is evident from the data presented in graphic form.

EXAMPLE 2

A plant experienced fouling problems due to increased column pressure drop. The pressure drop in this plant operated at normal values of 0.07 to 0.08 kilograms per centimeter$^2$. However, the fouling problems resulted in much elevated values ranging from 0.135 to 0.15 kilograms per centimeter$^2$. With the fouling problem, reduced feed rates and reflux rates were observed although the pressure drop in the column remained high.

In order to avoid a costly shut down of the manufacturing facility, the plant operators utilized the present invention wherein polysiloxane was injected into the quench oil tower at an injection rate of 10 to 20 parts per million based on column reflux rates. The specific polysiloxane utilized was identical to that of Example 1.

Figure 2:
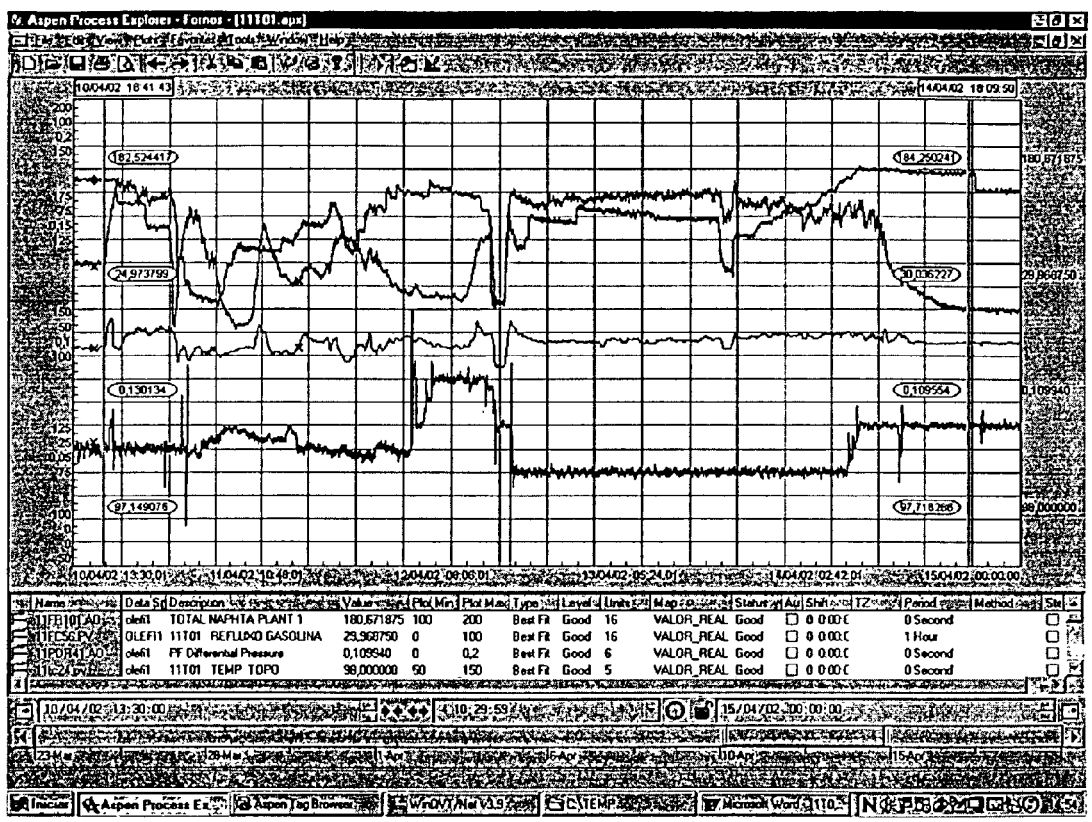
FIG. 2 illustrates data for Example 2 collected at in which column pressure for a quench tower is plotted against time.

Within hours after the initial injection of the anti-foam, operators observed column pressure reduced to a value of approximately 0.109 kilograms per centimeter$^2$ while the column feed rates improved from 175 tons per hour of naphtha to 184 tons per hour of naphtha. During the same time period, reflux rates increased from 20 tons per hour to 30 tons per hour. The improvement in column operations are shown in FIG. 2 in which sampling times are indicated along the X axis and column pressures are indicated in kilograms per centimeter$^2$ on the Y axis.

While the invention has been described with reference to preferred embodiments, those skilled in the art will appreciate that certain substitutions, alterations and omissions may be made without departing from the spirit of the invention. Accordingly, the foregoing description is meant to be exemplary only and should not limit the scope of the invention set forth in the following claims.

What is claimed is:

1. A method to extend run-length of a primary fractionator in an ethylene plant by reducing fouling and froth/foam formation and by reducing its column pressure drop, comprising the steps of:
    (a) feeding cracked gas to the primary fractionator, wherein:
        (i) the primary fractionator is experiencing severe fouling in a rectification section thereof;
        (ii) wherein severe fouling is a result of very rapid deposition of one or more fouling compounds selected from the group consisting of polymers of styrene, indene, di-vinylbenzene, alpha-methylstyrene, indenes, naphthalene, higher ring compounds and combinations thereof;
        (iii) wherein the severe fouling has been caused not only on upper tray surfaces, but also beneath tray surfaces resulting in increased column pressure drop along with its diminished operational efficiencies; and
        (iv) wherein the severe fouling due to very rapid deposition of fouling species also results in increased and excessive froth/foam formation, which in-turn results in further and very rapid increase in column pressure drop and thereby further reduced fractional efficiencies of the column as indicated by at least one of liquid-gas contact ratio, feed rate, reflux rate, product top temperature, gasoline end point or pressure differential;
    wherein, the process is characterized by:
    (b) essentially adding, continuously or periodically, an antifoulant-antifoaming agent to the primary fractionator reflux in an amount effective to reduce the deposits of fouling compounds and to reduce the froth/foam formation in the rectification section of the primary fractionators by injecting antifoulant-antifoaming agent along with reflux stream, wherein:
        (i) the antifoulant-antifoaming agent is polysiloxane; and
        (ii) the addition of antifoulant-antifoaming agent in above manner results in reduction of fouling by reducing deposits of fouling compounds and in reduction of froth/foam formation, and in reduction of column pressure drop as observed by change of colour of gasoline from brownish colour to its normal yellowish green colour and by improved operational efficiencies as indicated by at least one of liquid-gas contact ratio, feed rate, reflux rate, product top temperature, gasoline end point or pressure differential; and thereby
        (iii) results in extension of the run-length of the primary fractionator.

2. The method of claim 1 further comprising adding a corrosion inhibiting composition in step (b).

3. The method of claim 1 wherein the antifoulant-antifoam agent is added in a neat form or with a solvent.

4. The method of claim 3 wherein the solvent is an aromatic solvent.

5. The method of claim 4 wherein the solvent comprises toluene, xylene, naphtha, or combinations thereof.

6. The method of claim 1 wherein the primary fractionator comprises internal components comprising ripple trays, sleeve trays, bubble cap trays, valve trays, and combinations thereof.

7. The method of claim 1 wherein the antifoulant-antifoaming agent is present in an amount of from about 1 ppm to about 1000 ppm.

8. A method to extend run-length of a primary fractionator in an ethylene plant by reducing fouling, comprising the steps of:
(a) feeding cracked gas to the primary fractionator experiencing fouling, wherein the severe and continuous fouling and increased and excessive froth/foam formation result in very rapid increase in column pressure drop along with diminished operational efficiencies as indicated by at least one of liquid-gas contact ratio, feed rate, reflux rate, product top temperature, gasoline end point or pressure differential;
wherein the process is characterized by:
(b) essentially adding, continuously or periodically, an antifoulant-antifoaming agent to the primary fractionator reflux by injecting it along with reflux stream in an amount effective to reduce the deposits of fouling compounds in the rectification section of the primary fractionator, wherein:
(i) the antifoulant-antifoaming agent is polysiloxane; and
(ii) the addition of antifoulant-antifoaming agent in above manner results in reduction of fouling as observed by reduced column pressure drop and improved operational efficiencies; and thereby
(iii) results in extended run-length of the primary fractionator.

9. The method of claim 8 wherein the primary fractionator is experiencing fouling in a rectification section thereof.

10. The method of claim 8 wherein the fouling is a result of deposition of one or more fouling compounds selected from the group consisting of polymers of styrene, indene, di-vinylbenzene, alpha-methylstyrene, indenes, naphthalene, higher ring compounds and combinations thereof in the rectification section.

11. The method of claim 8 further comprising adding a corrosion inhibiting composition in step (b).

12. The method of claim 8 wherein the antifoulant-antifoaming agent is added in a neat form or with a solvent.

13. The method of claim 12 wherein the solvent is an aromatic solvent.

14. The method of claim 12 wherein the solvent comprises toluene, xylene, naphtha, or combinations thereof.

15. The method of claim 8 wherein the primary fractionator comprises internal components comprising ripple trays, sleeve trays, bubble cap trays, valve trays, and combinations thereof.

16. The method of claim 8 wherein the antifoulant-antifoaming agent is present in an amount of from about 1 ppm to about 1000 ppm.

17. The method of claim 8 wherein the operational efficiencies are improved as indicated by at least one of liquid-gas contact ratio, feed rate, reflux rate, product top temperature, gasoline end point or pressure differential.

18. The method of claim 9 wherein the fouling in rectification section is accompanied by poor viscosity control.

19. The method of claim 8 wherein step (b) results in a reduction in foaming in the primary fractionator.

20. The method of claim 18 wherein the poor viscosity control is experienced in bottom part of the fractionator.

21. The method of claim 1 wherein said polysiloxane is dimethyl polysiloxane.

22. The method of claim 8 wherein said polysiloxane is dimethyl polysiloxane.

23. A method of using an antifoulant-antifoaming agent in extending run-length of a primary fractionator in an ethylene plant by reducing fouling and froth/foam formation and by reducing column pressure drop therein, wherein the antifouling-antifoaming agent is added in a process comprising the steps of:
(a) feeding cracked gas to the primary fractionator, wherein:
(i) the primary fractionator is experiencing severe fouling in a rectification section thereof;
(ii) wherein severe fouling is a result of very rapid deposition of one or more fouling compounds selected from the group consisting of polymers of styrene, indene, di-vinylbenzene, alpha-methylstyrene, indenes, naphthalene, higher ring compounds and combinations thereof; and
(iii) wherein the severe fouling has been caused not only on upper tray surfaces, but also beneath tray surfaces resulting in increased column pressure drop along with its diminished operational efficiencies;
(iv) wherein the severe fouling due to very rapid deposition of fouling species also results in increased and excessive froth/foam formation, which in-turn results in further and very rapid increase in column pressure drop and thereby further reduced fractional efficiencies of the column as indicated by at least one of liquid-gas contact ratio, feed rate, reflux rate, product top temperature, gasoline end point or pressure differential;
characterized by:
(b) essentially adding, continuously or periodically, an antifoulant-antifoaming agent to the primary fractionator reflux in an amount effective to reduce the deposits of fouling compounds and to reduce the froth/foam formation in the rectification section of the primary fractionator by injecting antifoulant-antifoaming agent along with reflux stream, wherein:
(i) the antifoulant-antifoaming agent is polysiloxane; and
(ii) the addition of antifoulant-antifoaming agent in above manner results in reduction of fouling and froth/foam formation, and column pressure drop as observed by change of colour of gasoline from brownish colour to its normal yellowish green colour and by improved operational efficiencies as indicated by at least one of liquid-gas contact ratio, feed rate, reflux rate, product top temperature, gasoline end point or pressure differential; and thereby
(iii) results in extension of the run-length of the primary fractionator.

24. The method of claim 23 wherein said polysiloxane is dimethyl polysiloxane.

* * * * *